(12) United States Patent
Haartsen et al.

(10) Patent No.: US 6,714,530 B1
(45) Date of Patent: Mar. 30, 2004

(54) COMMUNICATION DEVICE AND METHOD OF OPERATION

(75) Inventors: Jaap Haartsen, Borne (NL); Sven Mattisson, Bjärre (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/271,552

(22) Filed: Mar. 18, 1999

(30) Foreign Application Priority Data

Mar. 20, 1998 (SE) ............................................. 9800938

(51) Int. Cl.[7] ............................ H04B 7/212; H04J 3/06; H04Q 7/20
(52) U.S. Cl. ....................... 370/347; 370/350; 370/442; 455/449
(58) Field of Search ................................ 370/347, 350, 370/442, 322, 336; 455/449, 450, 455, 126, 127, 177, 342, 522, 444

(56) References Cited

U.S. PATENT DOCUMENTS

| 3,639,838 A | * | 2/1972 | Kuhn et al. ................ 455/555 |
| 3,648,178 A | * | 3/1972 | Hershberg ................. 370/337 |
| 5,533,099 A | * | 7/1996 | Byrne ...................... 455/450 |
| 5,995,844 A | * | 11/1999 | Fukuda ..................... 455/462 |

FOREIGN PATENT DOCUMENTS

| EP | 0654 911 A2 | 5/1995 |
| EP | 0674 454 A2 | 9/1995 |
| GB | 2241850 A | 9/1991 |
| WO | WO 94/19877 A1 | 9/1994 |
| WO | WO 96/08901 A1 | 3/1996 |

OTHER PUBLICATIONS

Romedahl, B.; International–Type Search Report; Feb. 4, 1999; Search Request No. SE 98/00246; pp. 1–4.

Anderson, J.G.,; European Search Report; Aug. 31, 1998; EP98 85 0040; pp. 1–3.

* cited by examiner

*Primary Examiner*—Lee Nguyen
*Assistant Examiner*—Yuwen Pan
(74) *Attorney, Agent, or Firm*—Jenkens & Gilchrist, P.C.

(57) ABSTRACT

A short-range radio transmitter of a communication device comprising a short-range radio and a long-range radio is controlled to delay packets which are scheduled to be transmitted at the same time as a long-range transmitter of the long-range radio commences or discontinues to transmit. A frequency synthesizer of the short-range radio is thereby not affected by a change in the power supply voltage which otherwise occurs at these moments due to transmission with high power by the long-range transmitter.

36 Claims, 12 Drawing Sheets

COMMUNICATION DEVICE AND METHOD OF OPERATION

TECHNICAL FIELD OF INVENTION

The present invention relates to communication devices and their method of operation and, in particular, to communication devices comprising a first radio, e.g. a long-range radio, and a second radio, e.g. a short-range radio.

DESCRIPTION OF RELATED ART

Communication devices comprising two radios for operating in, for example, a short-range radio system and a long-range radio system are known in the art. The terminology of long-range radio system and short-range radio system refers to that the maximum power of transmission in a long-range radio system is greater than the maximum power of transmission in the short-range radio system. It should be noted, however, that the actual range in terms of distance could in fact be greater for the short-range radio than for the long-range radio. The long-range radio system may be used by the communication device to communicate with, for example, a base station in a cellular radio system. The short-range radio system may be used by the communication device to communicate with other devices in its surrounding, such as a home base station or an office base station. Another application for the short-range radio system is communication between a mobile phone, such as a cellular phone, and a hands-free equipment, for example, installed in a car.

Normally the short-range radio and the long-range radio of the communication device comprise frequency synthesizers for generating the signals to be transmitted by the respective radios. In most cases the frequency synthesizers operate well when the power supply provides a constant voltage. Even when power is supplied from a battery and the battery voltage changes slowly over time due to the charging status of the battery, the power supply voltage can be considered constant during a burst transmission.

Whilst the known communication device described above functions quite adequately, it does have a number of disadvantages.

A voltage drop at the power supply may be experienced when the long-range radio transmits. The reason for this is that the long-range radio often transmits with a relatively high power level which results in a large supply current from the power supply. The impedance of the power supply distribution lines and, if a battery makes up the power supply, the internal impedance of the battery result in the voltage drop. The output frequency of the frequency synthesizer used in the short-range radio system will change due to this voltage drop. Consequently, if the short-range radio is transmitting when the power supply voltage is dropping or recovering, due to the commencing or discontinuing of transmission by the long-range radio, the signal transmitted by the short-range radio will also change. In such a case a problem arises in that a receiver of another short-range radio device may have difficulties in receiving and decoding the signal transmitted by the short-range radio.

It is an object of the present invention to provide a communication device and a method of operating a communication device which overcome or alleviate the above mentioned problem.

SUMMARY

According to an aspect of the present invention there is provided a method of operating a communication device comprising circuitry for non-continuous transmission in a first radio system and circuitry for non-continuous transmission in a second radio system, the method comprising the step of avoiding transmission by the communication device within the second radio system which is planned to occur at the points in time the first radio system will commence or discontinue to transmit.

According to a further aspect of the present invention there is provided a communication device for communication in a first radio system and in a second radio system comprising a first radio transmitter for transmitting a signal to a radio apparatus in the first radio system, first controller means for controlling the operation of the first radio transmitter, a second radio transmitter for transmitting a signal to a radio apparatus in the second radio system, and second controller means for controlling the operation of the second radio transmitter, wherein the second controller means is adapted to avoid transmission by the second radio transmitter which is planned to occur at the points in time the first radio system will commence or discontinue to transmit.

The method of operating a communication device and the communication device achieve the advantage that a signal transmitted by the second radio transmitter, e.g. a short-range radio transmitter, is not affected by the operation of the first radio transmitter, e.g. long-range radio transmitter.

According to a further aspect of the present invention transmission by the communication device within the second radio system which is planned to occur during periods of time the first radio system will transmit is avoided.

The advantage of this is that the second transmitter, e.g. a short-range radio, cannot be affected by the operation of the first transmitter, e.g. a long-range radio, since they never transmit at the same time.

Preferably, transmission is avoided by delaying or advancing transmission within the second radio system.

In a further aspect of the present invention the transmission within the second radio system, e.g. a short-range radio system, takes place as packets, each packet being transmitted within a time-slot of a frame and each frame being made up of a number of time-slots.

According to a further aspect of the present invention each time-slot is partitioned into two pre-defined parts. In the first part the second radio, e.g. a short-range radio, of the dual communication device is allowed to transmit, i.e. another short-range radio is receiving. In the second part the short-range radio of the other short-range radio is allowed to transmit, i.e. the short-range radio of the dual communication device is receiving.

According to a further aspect of the present invention transmission is avoided during at least the whole of the time-slot in which it is decided that transmission is to be avoided.

The advantage of this is that if another radio device, e.g. another short-range radio device, is only allowed to transmit in a time-slot where it has received a transmitted packet from the second radio, e.g. the short-range radio, of the dual radio communication device, the dual radio communication device can control the transmission of this other radio device, i.e. the other short-range radio device, such that it occurs only during periods of time when the dual radio communication device knows that its first radio transmitter, i.e. the long-range radio transmitter, will not commence or discontinue to transmit. Consequently, the second radio receiver, i.e. the short-range radio receiver, of the dual radio communication device does not need to receive a radio signal, i.e. a short-range radio signal, during periods of time when the receiver frequency synthesizer may be disturbed due to a change in the potential of the power supply.

Preferably, the method of operating a communication device further comprises the step of determining if a packet to be delayed, as a result of delaying transmission within the second radio system, includes compressed data covering one slot and if so replacing the packet to be delayed with a packet of the type corresponding to compressed data covering several slots.

Preferably, the communication device further comprises means for determining if a packet to be delayed, as a result of delaying transmission within the second radio system, includes compressed data covering one slot, and means for replacing the packet to be delayed with a packet of the type corresponding to compressed data covering several slots if the packet corresponds to a packet with compressed data covering one slot.

Advantageously, the method of operating a communication device further comprises the step of establishing the number of slots, set equal to n, the packet to be delayed will be delayed, and wherein the packet to be delayed is replaced with a packet of the type corresponding to compressed data covering m slots, where m is equal to n+1.

Advantageously, the communication device further comprises means for establishing the number of slots, set equal to n, the packet to be delayed will be delayed, and wherein the means for replacing the packet to be delayed replaces the packet with a packet of the type corresponding to compressed data covering m slots, where m is equal to n+1.

The advantage with this is that packets with compressed data covering one slot can be delayed although they should have been transmitted every slot.

According to a further aspect of the present invention there is provided a method of operating a communication device comprising circuitry for communication in a radio system in which transmission takes place as bursts, each burst being transmitted within a time-slot of a frame and each frame being made up of a number of time-slots, the method comprising the steps of i) establishing information representing the points in time a time-slot begins and ends, ii) receiving a transmitted radio burst in the radio system, iii) establishing whether the received radio burst is received during said time-slot and iv) allowing returned transmission within the time-slot only if a packet was received during the time-slot.

According to a further aspect of the present invention there is provided a communication device for communication in a radio system in which transmission takes place as bursts, each burst being transmitted within a time-slot of a frame and each frame being made up of a number of time-slots, the device comprising a radio transmitter for transmitting a signal to a radio apparatus in the radio system, controller means for controlling the operation of the radio transmitter, a radio receiver for receiving a transmitted burst from a radio apparatus in the radio system, first means for establishing information representing the points in time a time-slot begins and ends, second means for establishing whether a received radio burst is received during said time-slot and wherein the controller means allows the radio transmitter to transmit during said time-slot only if a radio burst has been received during the time-slot.

The advantage of this method of operating a communication device and this communication device is that transmission can be controlled to occur under control by another radio device. This allows the other radio device to avoid the need for receiving a radio signal when it is unsuitable. This may be during periods of time when the other radio device knows that a separate transmitter will commence or discontinue to transmit and, consequently, may disturb a receiver frequency synthesizer due to a change in the potential of its power supply.

The advantage that a signal transmitted by the second radio, e.g. a short-range radio, is not affected by the operation of the first transmitter, e.g. a long-range transmitter, is achieved by avoiding transmission by the communication device within the second radio system, i.e. the short-range radio system, which is planned to occur at the points in time the first radio system, i.e. the long-range radio system, will commence or discontinue to transmit.

The advantage that packets with compressed data covering one slot can be delayed although they should have been transmitted every slot is achieved by replacing the packet to be delayed with a packet of the type corresponding to compressed data covering several slots if the packet corresponds to a packet with compressed data covering one slot.

The advantage that transmission can be controlled to occur under control by another radio device is achieved by allowing returned transmission within the time-slot only if a packet was received during the time-slot.

DETAILED DESCRIPTION OF EMBODIMENTS

Embodiments of the present invention are described below, by way of example only.

Figure 1:
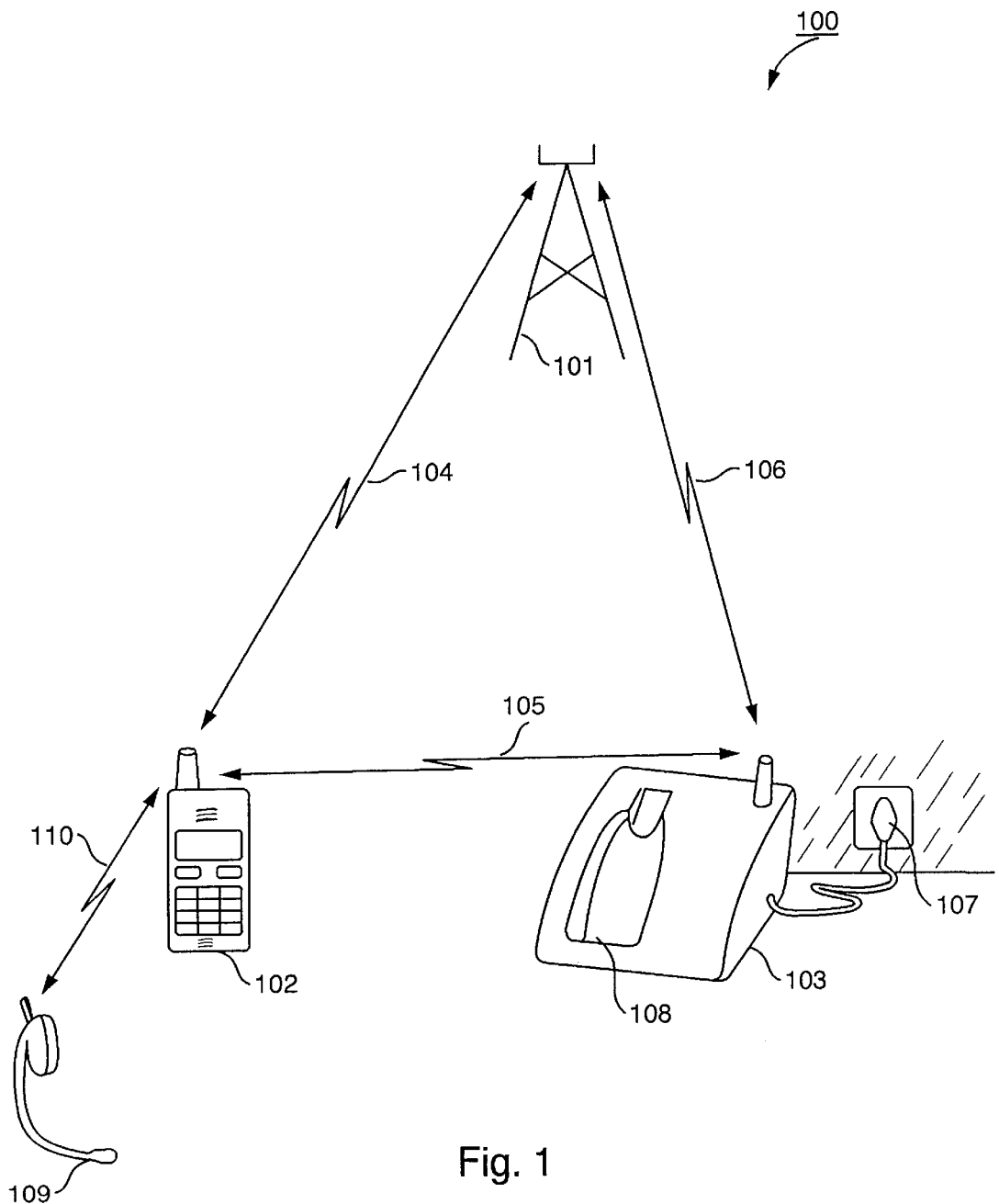
FIG. 1 shows a communication system illustrating a short-range radio system and a long-range radio system.

FIG. 1 shows a communication system 100 illustrating a short-range radio system and a long-range radio system. The long-range radio system can be a cellular radio system, e.g. the GSM (Global System for Mobile communications). The long-range radio system comprises at least one base station 101 and at least one communication device such as a mobile communication device 102 or a fixed communication device 103. In the example of FIG. 1, a mobile communication device 102 communicates with the base station 101 by means of the long-range radio system as is indicated by arrow 104. The mobile communication device may also communicate with a fixed communication device 103 by means of the short-range radio system. In FIG. 1 this is indicated by arrow 105. The terminology of long-range radio system and short-range radio system refers to that the maximum power of transmission in a long-range radio system is greater than the maximum power of transmission in the short-range radio system. It should be noted, however, that the actual range in terms of distance could in fact be greater for the short-range radio than for the long-range radio. In the example of FIG. 1 the mobile communication device 102 also communicates with a hands-free equipment 109 by means of the short-range radio system as is illustrated by the arrow 110. The fixed communication device 103 communicates with the base station 101 by means of the long-range radio system illustrated by arrow 106 or with a Public Switched Telephone Network, PSTN, through a wire connection 107. Often the fixed communication device 103 is only adapted to communicate with either the base station 101 or the PSTN. The fixed communication device 103 may also comprise a holder 108 where a mobile communication device can be placed. When a mobile communication device is placed in the holder it may be charged by a charger built into the fixed communication device.

Various alternatives of operation exist. For example, a subscriber of a mobile communication device 102 may communicate with another subscriber either by connecting the call by means of the long-range radio system (arrow 104) via the base station 101, or by connecting the call by means of the short-range radio system (arrow 105) via the fixed communication device 103 which, in turn, establishes a connection by means of the long-range radio system (arrow 106) or by means of the PSTN. In the case where the short-range radio is involved the fixed communication device 103 performs a relay function between the mobile communication device 102 and the long-range radio system or the PSTN. Similarly, the mobile communication device 102 may act as a relay station between the hands-free equipment 109 and the long-range radio system (arrow 104) or the short-range radio system (arrow 105). It should be understood that the short-range radio system may be used in several other applications (not shown).

A communication device having the possibility to communicate by means of the short-range radio system as well as the long-range communication system is referred to as a dual radio communication device.

Figure 2:
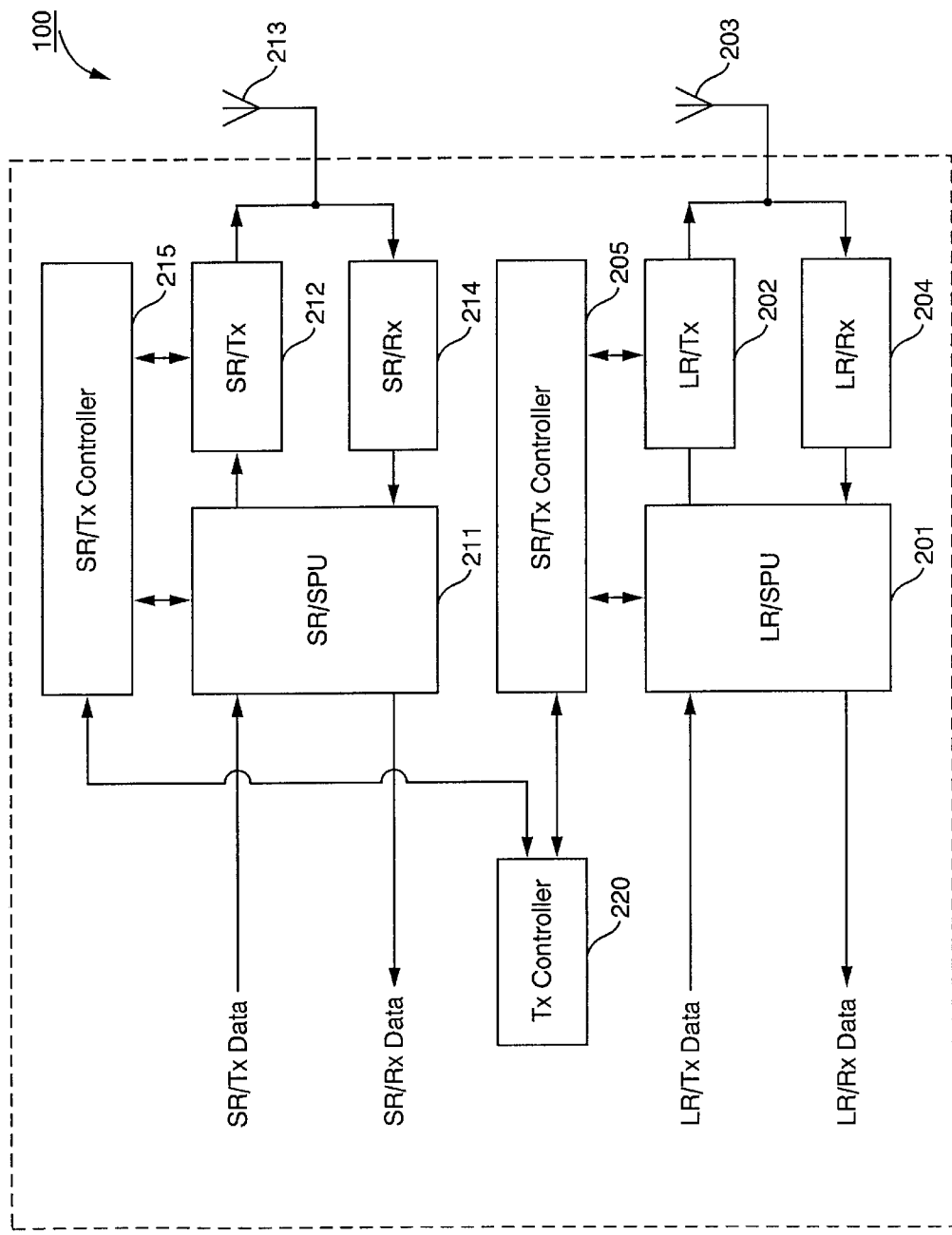
FIG. 2 shows a block diagram illustrating a communication device according to the present invention.

FIG. 2 shows a block diagram illustrating a dual radio communication device 200 according to the present invention. Data, $LR/T_x Data$, to be transmitted by means of the long-range radio system is provided to a transmit input of a long-range signal processing unit, LR/SPU, 201. A transmit output of the LR/SPU 201 is connected to a long-range transmitter, $LR/T_x$, 202. The output of the $LR/T_x$ 202 is connected to a first antenna 203 constituting a first air-interface. The first antenna 203 is also connected to a long-range receiver, $LR/R_x$, 204. The output of the $LR/R_x$ 204 is connected to a receiver input of the LR/SPU 201. The LR/SPU 201 has a receiver output for providing long-range received data, $LR/R_x Data$. The LR/SPU 201 and the $LR/T_x$ 202 are controlled by a long-range transmit controller, $LR/T_x$ Controller, 205, illustrated in FIG. 2 by the bi-directional connections between the $LR/T_x$ Controller 205 and the LR/SPU 201 and the $LR/T_x$, 202 respectively.

Similarly, data, $SR/T_x Data$, to be transmitted by means of the short-range radio system is provided to a transmit input of a short-range signal processing unit, SR/SPU, 211. A transmit output of the SR/SPU is connected to a short-range transmitter, $SR/T_x$, 212. The output of the $SR/T_x$ 212 is connected to a second antenna 213 constituting a second air-interface. The second antenna 213 is also connected to a short-range receiver, $SR/R_x$, 214. The output of the $SR/R_x$ 214 is connected to a receiver input of the SR/SPU 211. The SR/SPU 211 has a receiver output for providing short-range received data, $SR/R_x Data$. The SR/SPU 211 and the $SR/T_x$ 212 are controlled by a short-range transmit controller, $SR/T_x$ Controller, 215, illustrated in FIG. 2 by the bi-directional connections between, the $SR/T_x$ Controller 215 and the SR/SPU 211 and the $SR/T_x$ 212, respectively.

The operation of the $LR/T_x$ Controller 205 and the $SR/T_x$ Controller 215 are controlled by a transmit controller, $T_x$ Controller, 220.

The inputs and outputs of the LR/SPU 201 and the SR/SPU 211 referring to $LR/T_x Data$, $LR/R_x Data$, $SR/T_x Data$ and $SR/R_x Data$ are connected to other functional blocks (not shown) of the dual radio communication device. For example, the $LR/T_x Data$ may be generated by a speech encoder and represent an encoded format of a voice signal picked up by a microphone and the $LR/R_x Data$ may be forwarded to a speech decoder for generating a voice signal by means of a loudspeaker. The $SR/T_x Data$ and $SR/R_x Data$ may be connected in a similar manner.

Several alternative embodiments of the dual radio communication device are conceivable. For example, duplex filters may be introduced to connect the antennas 203, 213 to the transmitters 202, 212 and receivers 204, 214, respectively. Preferably, the long-range and short-range radio elements and the signaling processing units are commonly implemented such as to reuse common parts as much as possible. It is also possible to design the transmitters 202, 212 and receivers 204, 214 such that a common antenna can be used instead of the first and second antennas. Furthermore, the $LR/T_x$ Controller 205, $SR/T_x$ Controller 215 and the $T_x$ Controller 220 are preferably implemented as one controller.

Figure 3:
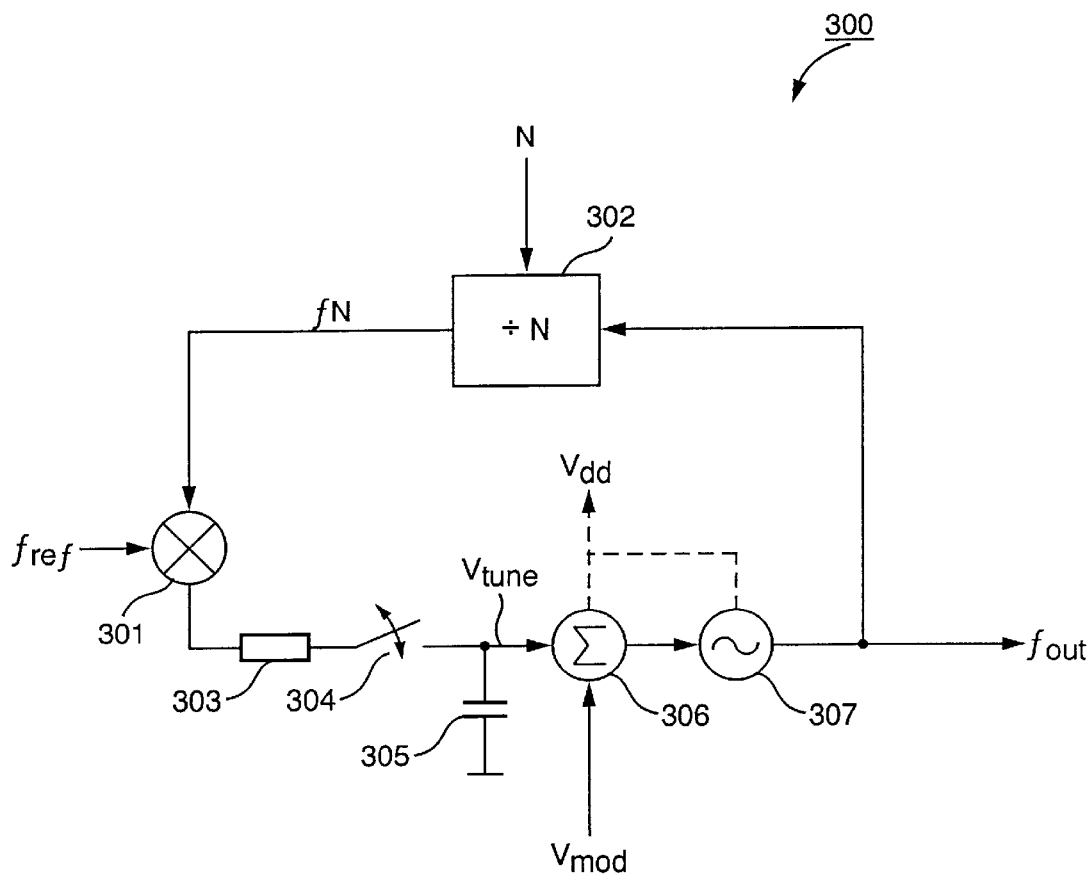
FIG. 3 shows a circuit diagram of a frequency synthesizer illustrating an aspect of the present invention.

The LR/SPU 201 and the SR/SPU 211 include, for example, circuitry for digitizing the signal from the receivers 204, 214, channel coding, channel decoding and interleaving. FIG. 3 shows a circuit diagram of a frequency synthesizer 300, also referred to as an open-loop modulator, which may be incorporated in the SR/SPU 211. The frequency synthesizer 300 generates an output signal, having a frequency $f_{out}$, which is forwarded to and transmitted by the $SR/T_x$ 212. The LR/SPU 211 may incorporate a similar frequency synthesizer for generating an output signal to be transmitted by the $LR/T_x$ 202. The frequency synthesizer 300 comprises a phase detector 301 comprising a first input for receiving a reference frequency signal having frequency $f_{ref}$, and a second input for receiving an output signal of a frequency divider, ÷N, 302 having frequency $f_N$. The output of the phase detector 301 is connected to a first terminal of a resistor 303. The second terminal of the resistor 303 is connected to a first terminal of a switch 304. A second terminal of the switch 304 is connected to a first terminal of a capacitor 305 and to a first input terminal of a voltage adding means 306. The first and the second terminals of the switch 304 are only connected to each other when the switch is closed. The switch is controlled by a controller (not shown). The second terminal of the capacitor 305 is connected to ground potential. A second input terminal of the voltage adding means 306 receives a modulation signal labeled $V_{mod}$. The output terminal of the voltage adding means 306 is connected to an input of a voltage controlled oscillator 307. The output of the voltage controlled oscillator 307, which constitute the output signal of the frequency synthesizer 300, is connected to an input of the frequency divider 302. The frequency divider receives a control signal, having a value N, from a controller (not shown). The elements of the frequency synthesizer are provided with power from a power supply, $V_{dd}$. Power supply to the voltage adding means 306 and the voltage controlled oscillator 307 is illustrated in FIG. 3 by a dashed line connecting them to the power supply, $V_{dd}$.

In operation, the switch 304 is first closed and the modulation signal, $V_{mod}$, is held constant at a pre-defined level. The frequency synthesizer will now operate as a phase-locked loop, PLL. The phase detector 301 compares the phase of the reference frequency signal to the phase of the output signal of the frequency divider 302. The voltage outputted by the phase detector 301 charges or discharges the capacitor 305. The voltage at the first terminal of the capacitor 305 is added to the modulation voltage, $V_{mod}$, and the output voltage of the voltage adding means 306, i.e. the sum of the two voltages inputted to the voltage adding means 306, is forwarded to the input of the voltage controlled oscillator 307. The voltage controlled oscillator generates an output signal having frequency $f_{out}$, which depends on the inputted voltage. In the frequency divider 302 the frequency $f_{out}$ is divided by N. The generated output signal, having the frequency $f_N = f_{out}/N$, is forwarded to the phase detector 301.

After a while the output frequency, $f_{out}$, of the frequency synthesizer 300 stabilizes at a frequency equal to the reference frequency, $f_{ref}$, times the division factor, N (i.e. $f_{out} = f_{ref} \times N$). The potential at the first terminal of the capacitor 305, $V_{tune}$, has then assumed the potential $V_{locked}$. When the switch 304 is opened the output frequency $f_{out}$ of the frequency synthesizer 300 will remain fairly constant since the capacitor 305 keeps the voltage at its first terminal $V_{tune} \approx V_{locked}$ of course in the long run the capacitor 305 will discharge and the output frequency $f_{out}$ will change but, as is well known in the art, with a proper choice of capacitor 305 in combination with a low-current consuming input of the voltage adding means 306 the output frequency, $f_{out}$, can be considered to be constant for at least a specified period of time. Preferably this specified period of time exceeds the period of time needed for a particular signal to be transmitted, i.e. during a transmission burst or during transmission of a packet. By varying the modulation signal, $V_{mod}$, the output voltage of the voltage adding means 306 will be varying accordingly and the voltage controlled oscillator 307 will generate a correspondingly modulated frequency.

Figure 4:
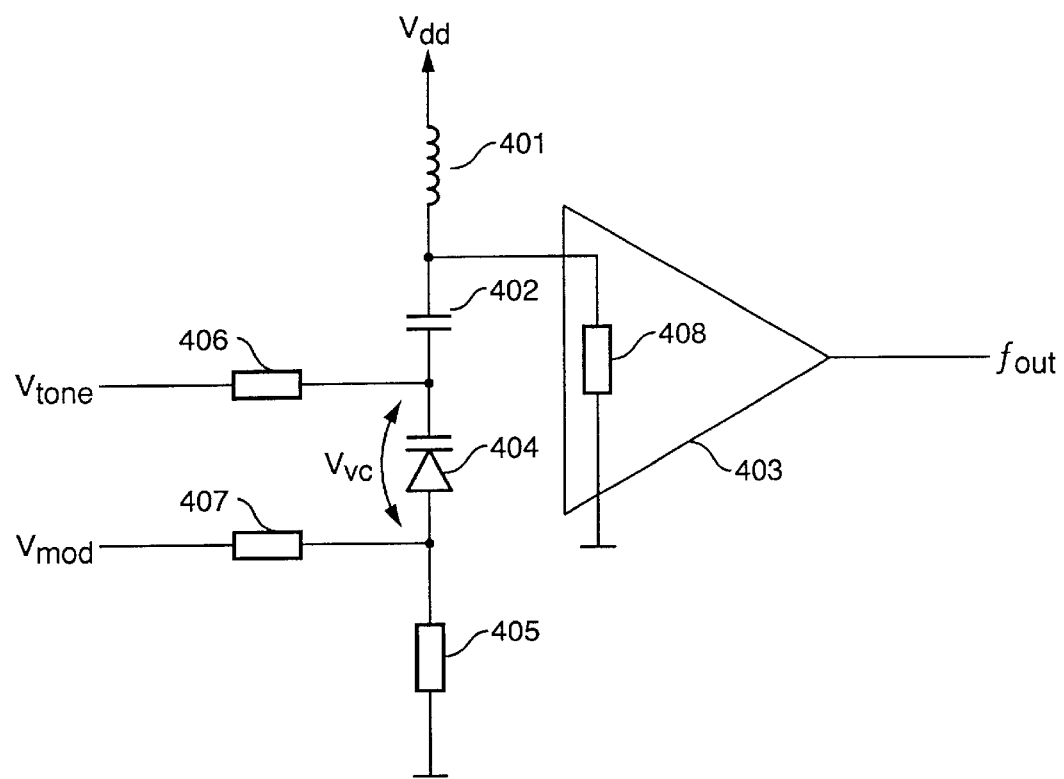
FIG. 4 shows a circuit diagram of an oscillator illustrating an aspect of the present invention.

FIG. 4 shows a circuit diagram of an oscillator circuit 400 which may be an implementation of the voltage adding means 306 (FIG. 3) and the voltage controlled oscillator 307 (FIG. 3) discussed above. The power supply, $V_{dd}$, is connected to a first terminal of an inductor 401. The second terminal of the inductor 401 is connected to a first terminal of a capacitor 402 and to an input terminal of an amplifying circuit 403. The second terminal of the capacitor 402 is connected to a cathode terminal of a capacitance diode, also called varicap, 404. The capacitance, $C_{vc}$, of a varicap is dependent on the voltage across the component. The voltage across the component is labeled $V_{vc}$ in FIG. 4. Normally, the capacitance, C, is in inverse proportion to the square root of the voltage across the component $V_{vc}$, i.e. $C \sim (V_{vc})^{-\frac{1}{2}}$. The anode terminal of the capacitance diode 404 is connected to a first terminal of a first resistor 405. The second terminal of the first resistor 405 is connected to ground potential. The potential at the first terminal of the capacitor 305 (FIG. 3), $V_{tune}$, is connected to a first terminal of a second resistor 406. The second terminal of the second resistor 406 is connected to the cathode terminal of the capacitance diode 404. The modulation signal, $V_{mod}$, (FIG. 3) is connected to a first terminal of a third resistor 407. The second terminal of the third resistor 407 is connected to the anode terminal of the capacitance diode 404. The amplifying circuit is only drawn schematically and the input impedance, illustrated as an impedance element 408, is designed to have a negative value. The design of an amplifying circuit having a negative input impedance is well known in the art of amplifying circuits. The frequency of the output signal of the amplifying circuit 403 is labeled $f_{out}$ which corresponds to $f_{out}$ in FIG. 3.

The oscillator circuit 400 forms a resonator, which oscillates with a frequency dependent on the inductance of the inductor 401, the capacitance of the capacitor 402 and the capacitance diode 404, according to well known principles. The oscillating frequency is affected by $V_{tune}$ and $V_{mod}$ since the potentials of these signals influence the potential, $V_{vc}$, across the capacitance diode 404 and, hence, its capacitance. It should be noted that the oscillating frequency is also affected by the potential of the power supply, $V_{dd}$. If the potential of the power supply changes the potential, $V_{vc}$, across the capacitance diode 404 will also change and, consequently, the capacitance of the capacitance diode.

The influence of the voltage of the power supply, $V_{dd}$, does normally not provide any problems. Even when power is supplied from a battery and the battery voltage changes slowly over time due to the charging status of the battery, the potential can be considered to be constant during a short transmission burst.

In the case where the communication device comprises a long-range radio and a short-range radio, as described above, a sudden power supply voltage drop may be experienced when the long-range radio transmits. The reason for this is that the long-range radio often transmits with a relatively high power level which requires a large supply current from the battery. The internal impedance of the battery and the impedance of the power supply distribution lines result in the voltage drop. The person skilled in the art understands that a voltage drop may also occur when the power is supplied by another source than a battery.

Figure 5:
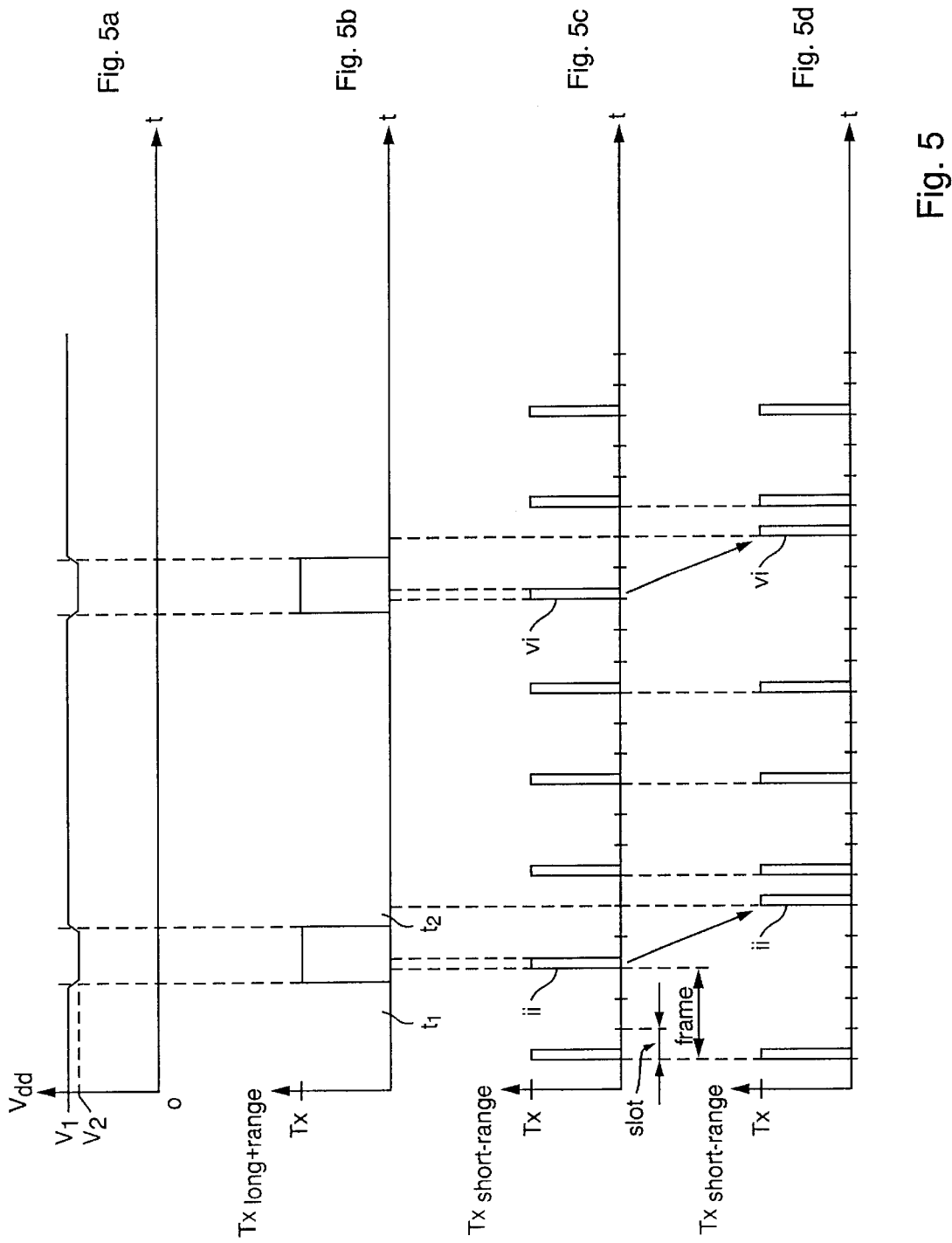
FIG. 5 shows timing diagrams illustrating the operation of a conventional communication device and a communication device according to a first embodiment of the present invention.

As discussed above, a power supply voltage drop will in many cases affect the frequency of the output signal from a frequency synthesizer. An open-loop modulator is an example of a frequency synthesizer for which the operation is detrimentally affected by a power supply voltage drop. FIG. 5a to FIG. 5c show timing diagrams illustrating the operation of a conventional dual radio communication device. In FIG. 5a the power supply voltage, $V_{dd}$, in FIG. 5b transmission by the long-range radio and in FIG. 5c conventional transmission by the short-range radio are shown all as functions of time, t. In FIG. 5 all time-axes have a common time-scale. In this example, as is illustrated in FIG. 5c, a conventional short-range radio transmits within every first time-slot of a frame, where each frame is being made up of three time-slots. In FIG. 5b and FIG. 5c it is illustrated that the long-range transmitter transmits at the same time as the conventional short-range transmitter transmits the second packet (labeled: ii) and the sixth packet (labeled: vi). At the same time as the long-range transmitter transmits it is illustrated in FIG. 5a how the power supply voltage, $V_{dd}$, drops from $V_1$ to $V_2$. As described above, this voltage drop will affect the output frequency, $f_{out}$, of the frequency synthesizer used in the short-range radio and, hence, the transmitted frequency.

Figure 9:
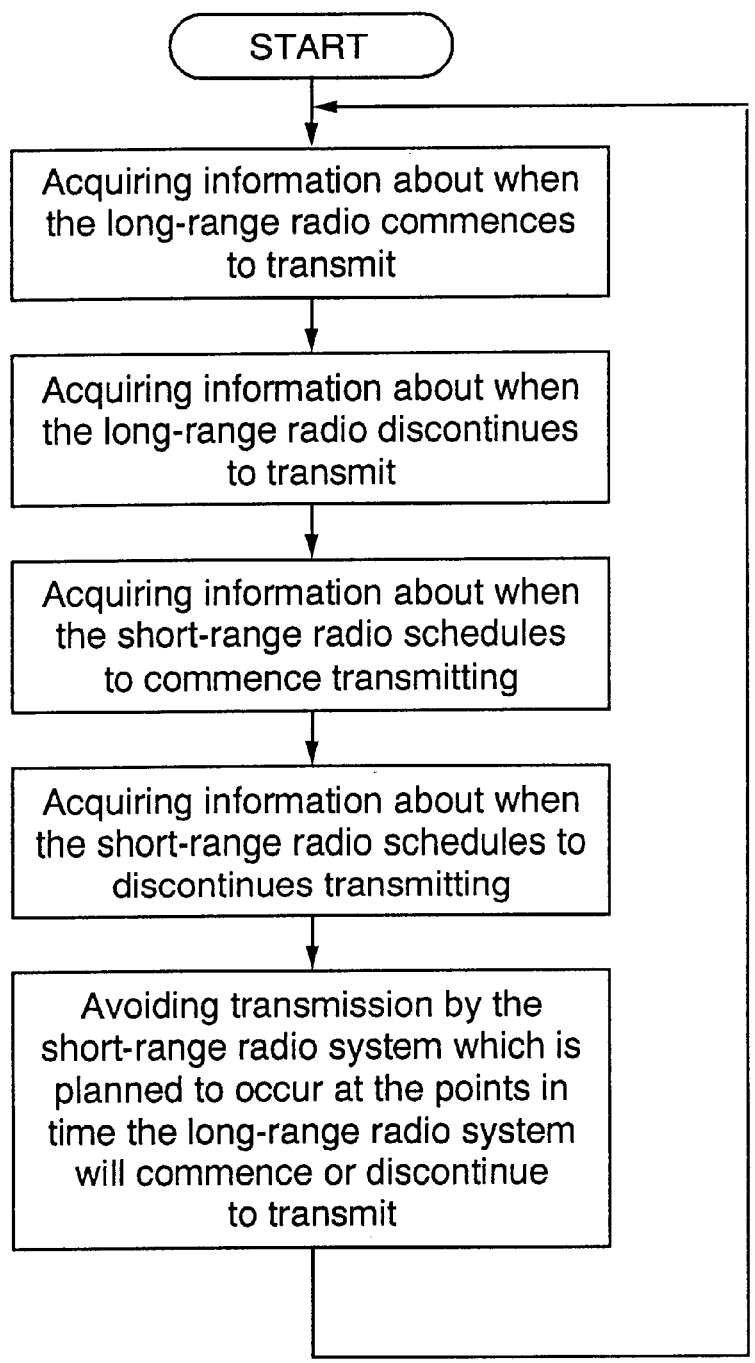
FIG. 9 shows a flow diagram illustrating a method of operating a communication device according to an embodiment of the present invention.
Figure 10:
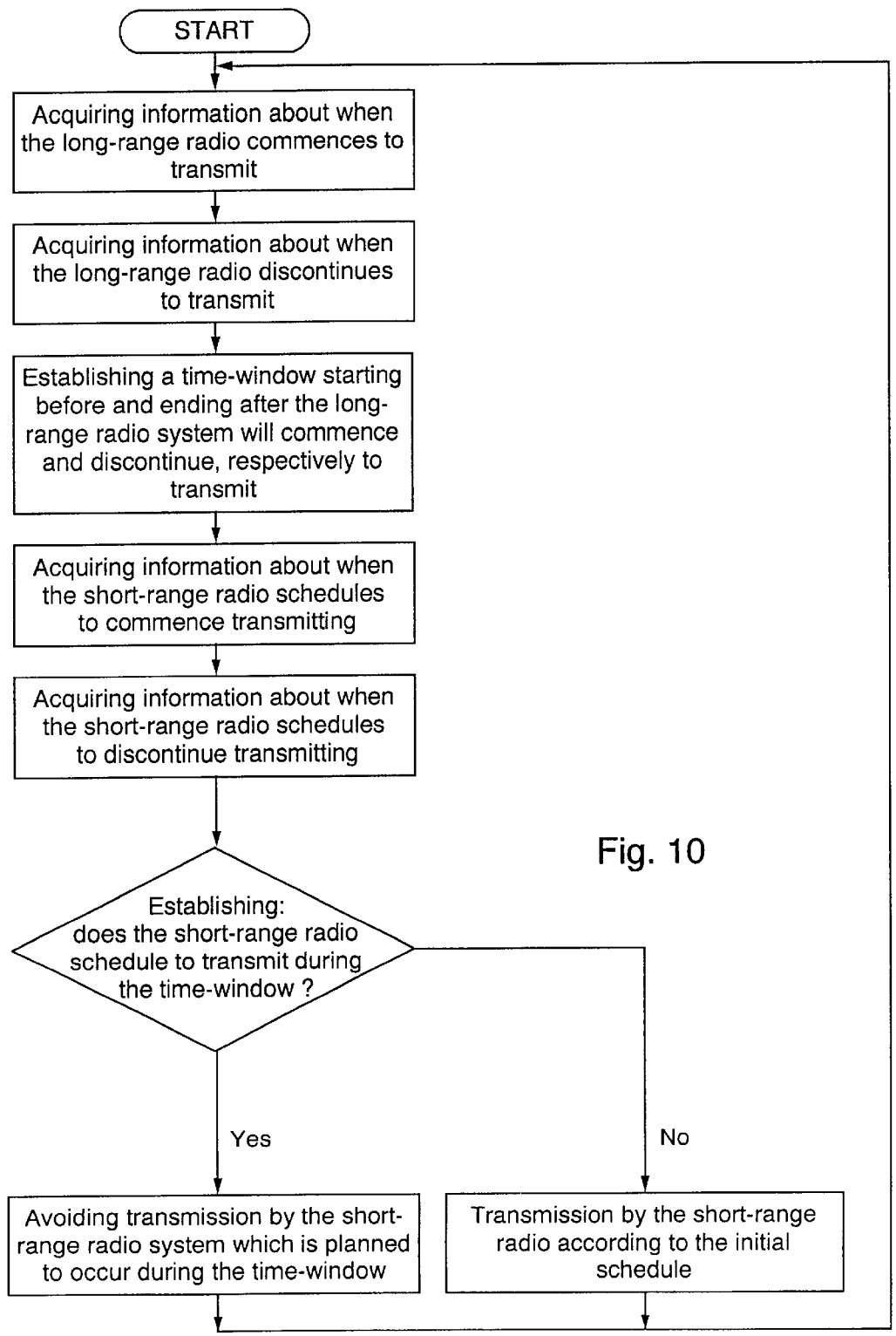
FIG. 10 shows a flow diagram illustrating a method of operating a communication device according to an embodiment of the present invention.

In a first embodiment of the present invention the $T_x$ Controller 220 (FIG. 2) first establishes when the long-range radio will commence to transmit and when the long-range radio will discontinue to transmit. This information is forwarded from the LR/$T_x$ Controller 205 to the $T_x$ Controller 220. Next the $T_x$ Controller 220 forwards this information to the SR/$T_x$ Controller which controls the SR/SPU 211 and/or the SR/$T_x$ 212 such that the short-range radio defers from transmitting during the periods when the long-range radio is transmitting, i.e. simultaneous transmission is prevented. This method of operating a dual radio communication device is further illustrated in FIG. 9. Preferably the short-range radio defers from transmitting from a first point in time before the long-range radio commences to transmit, illustrated by $t_1$ in FIG. 5b, up to a second point in time after the long-range radio discontinues to transmit, illustrated by $t_2$ in FIG. 5b. A time-window (from $t_1$ to $t_2$) is thereby defined during which transmission by the short-range radio is avoided. This method of operating a dual radio communication device is further illustrated in FIG. 10. FIG. 5a, FIG. 5b and FIG. 5d show timing diagrams illustrating the operation of the first embodiment. In FIG. 5a the power supply voltage, $V_{dd}$, in FIG. 5b transmission by the long-range radio and in FIG. 5d transmission by the short-range radio are shown as functions of time, t. In FIG. 5 all time-axes have a common time-scale. In FIG. 5b and in FIG. 5c it is illustrated how the long-range radio transmits at the same time as the conventional short-range radio would have transmitted the second packet (labeled: ii) and sixth packet (labeled: vi), as is indicated in FIG. 5d. According to the first embodiment of the present invention the second packet (labeled: ii) and sixth packet (labeled: vi) are deferred and transmitted at a later slot. It should be noted that hereby the power supply voltage drop illustrated in FIG. 5a will not occur at the same time as the short-range radio transmits and thereby not affect the frequency synthesizer of the short-range radio. For a packet-switched connection the delay of transmission by the short-range radio constitutes no problem since it only delays the packet delivery. However, for a circuit-switched connection a problem arises in that an expected packet is delivered late. This problem can be solved by introducing a FIFO (First-In-First-Out) buffer in both the sending device and in the receiving device. It should be noted that only packets that may cause collisions are delayed. All other packets are transmitted according to the timing of the circuit-switched framing. In this way no accumulation delay occurs. The new scheme (FIG. 5d) provides an isochronous flow, but with buffering the isochronous flow can be transformed to a synchronous flow, i.e. in average the repetition interval (frame length) is constant.

In the case where the transmission burst or the transmitted packet of the long-range transmitter is longer than the length of a frame of the short-range radio system the dual radio communication device of the first embodiment requires a larger buffer due to the introduced delay. Furthermore, the long delay reduces the data capacity of the transmission link in the short-range radio system.

Figure 11:
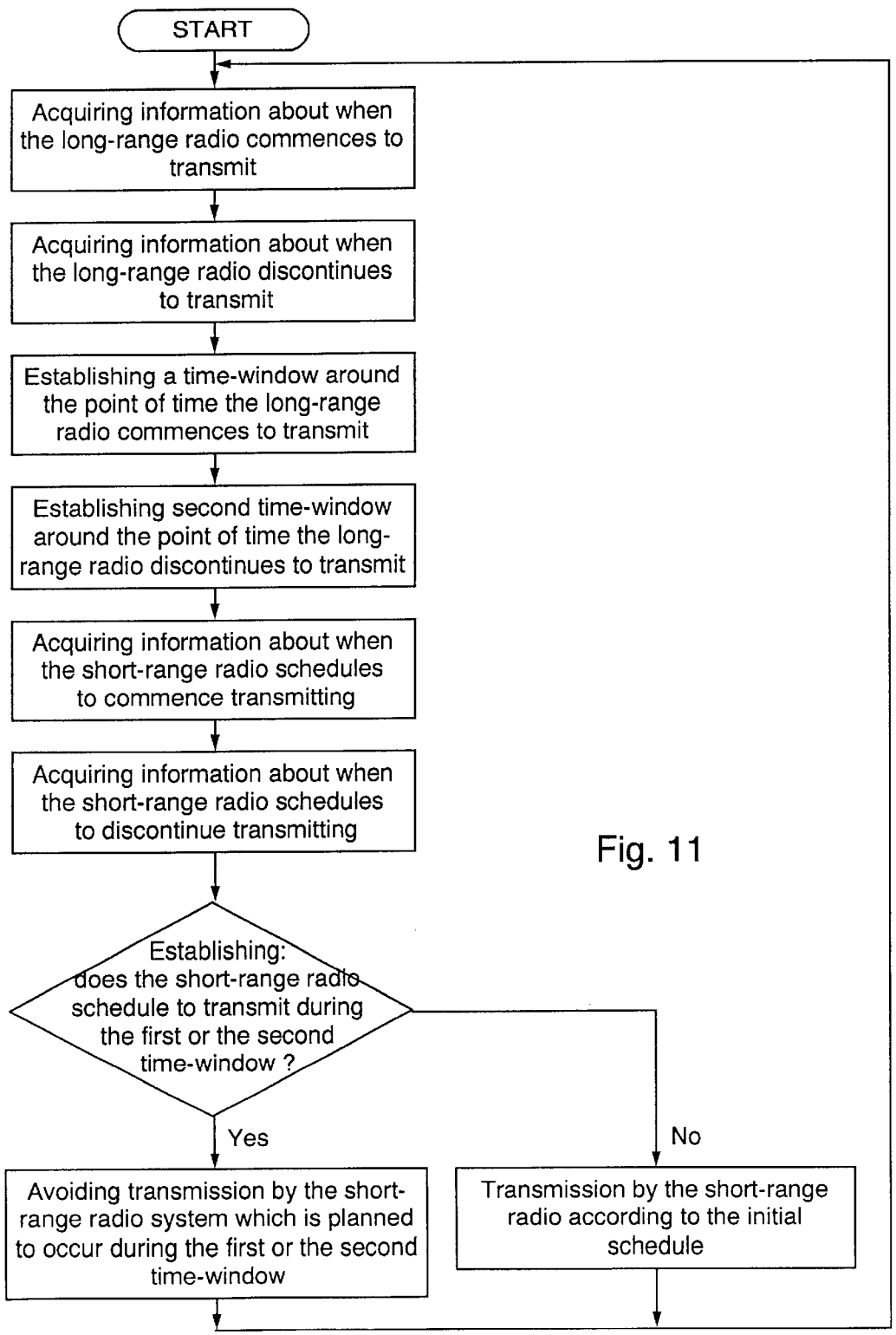
FIG. 11 shows a flow diagram illustrating a method of operating a communication device according to an embodiment of the present invention.

In a second embodiment of the present invention the $T_x$ Controller 220 (FIG. 2) first establishes when the long-range radio will commence to transmit and when the long-range radio will discontinue to transmit. This information is forwarded from the LR/$T_x$ Controller 205 to the $T_x$ Controller 220. Next the $T_x$ Controller 220 forwards this information to the SR/$T_x$ Controller which controls the SR/SPU 211 and/or the SR/$T_x$ 212 such that the short-range radio defers from transmitting from a third point in time before the long-range radio commences to transmit up to a fourth point in time after the long-range radio commences to transmit and from a fifth point in time before the long-range radio discontinues to transmit up to a sixth point in time after the long-range radio discontinues to transmit. This method of operating the dual radio communication device is further illustrated in FIG. 11.

Figure 6:
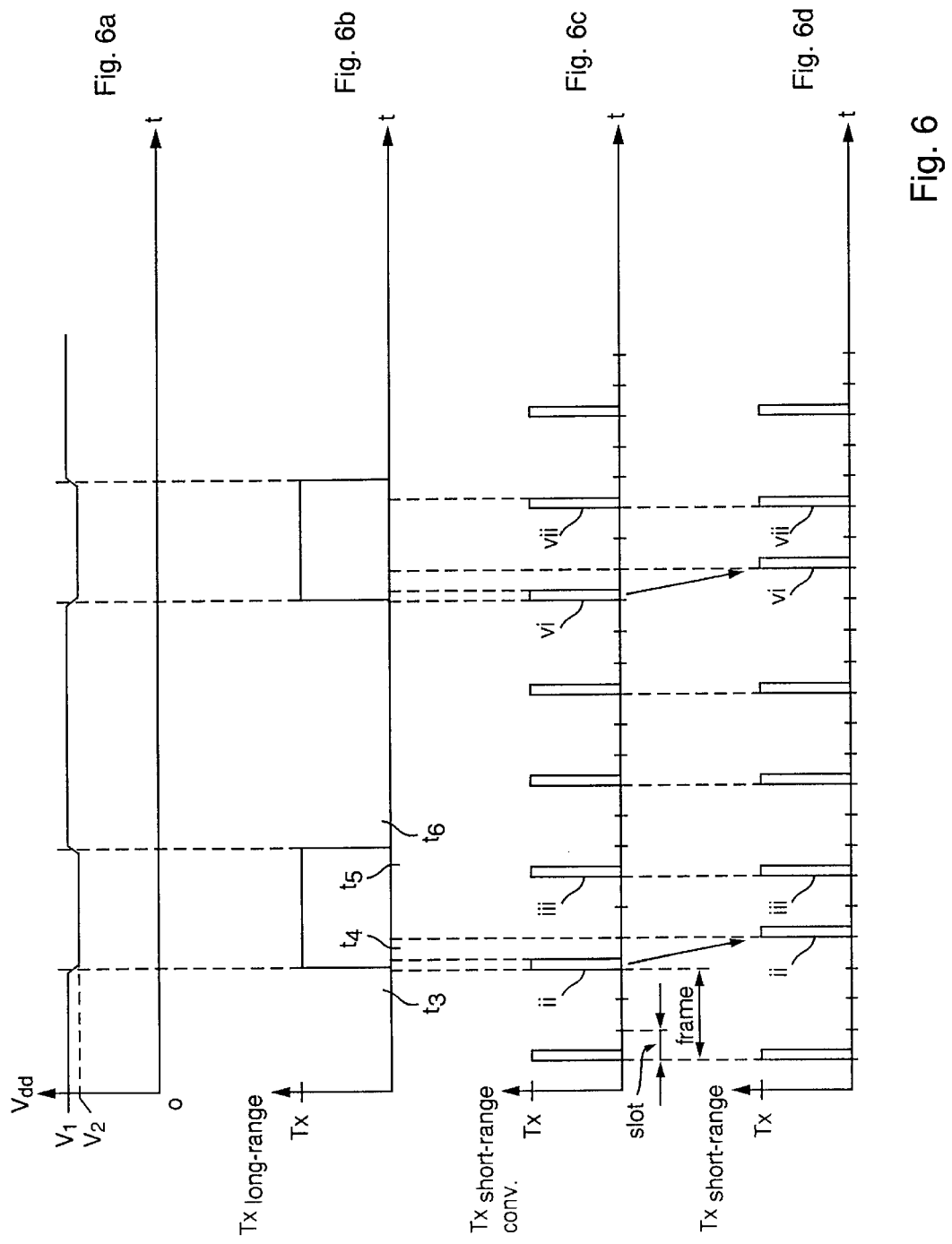
FIG. 6 shows timing diagrams illustrating the operation of a conventional communication device and a communication device according to a second embodiment of the present invention.

In FIG. 6a the power supply voltage, $V_{dd}$, in FIG. 6b transmission by the long-range radio, in FIG. 6c conventional transmission by the short-range radio and in FIG. 6d transmission by the short-range radio according to the second embodiment are shown all as functions of time, t. In FIG. 6 all time-axes have a common time-scale. The third, fourth fifth and sixth points in time mentioned above are illustrated by $t_3$, $t_4$, $t_5$ and $t_6$, respectively, in FIG. 6b. A first time-window (from $t_3$ to $t_4$) and a second time-window (from $t_5$ to $t_6$) are thereby defined during which transmission by the short-range radio is avoided. In FIG. 6b and FIG. 6c it is illustrated that the long-range transmitter transmits at the same time as the conventional short-range transmitter transmits the second packet (labeled: ii), third packet (labeled: iii), sixth packet (labeled: vi) and seventh packet (labeled: vii). At the same time as the long-range transmitter transmits it is illustrated in FIG. 6a how the power supply voltage, $V_{dd}$, drops from $V_1$ to $V_2$. Again, this affects the output frequency, $f_{out}$, of the frequency synthesizer used in the short-range radio. FIG. 6d shows a timing diagram illustrating the operation of the second embodiment. According to the second embodiment of the present invention the second packet (labeled: ii) and sixth packet (labeled: vi) are deferred and transmitted at a later slot, as is indicated in FIG. 6d. This occurs since these packet would have been transmitted close to the point in time the long-range radio commences to transmit (e.g. during the time-window from $t_3$ to $t_4$ as is illustrated in FIG. 6b) The third packet (labeled: iii) and the seventh packet (labeled: vii), however, are not delayed. The reason for this is that they are transmitted at a point in time which is sufficiently far away from the point in time when the long-range transmitter discontinues to transmit (e.g. outside the time-windows from $t_5$ to $t_6$ as is illustrated in FIG. 6b). The third and the seventh packets will not be affected by the power supply voltage drop (from $V_1$ to $V_2$ in FIG. 6a) occurring at the same time due to the transmission by the long-range radio because the frequency synthesizer of the short-range radio will experience a constant power supply voltage, i.e. $V_2$. For example, the frequency synthesizer 300 (FIG. 3) comprising an oscillator circuit 400 (FIG. 4), discussed above, will lock (when switch 304 is closed) at a correct frequency, $f_{locked}$, and the lower power supply voltage ($V_2$) will not affect this frequency, $f_{locked}$ Neither will the lower power supply voltage affect the frequency modulation created by the modulation signal, $V_{mod}$, What is important is to prevent the short-range transmitter to transmit when the power supply voltages change, i.e. drops from $V_1$ to $V_2$ or increases from $V_2$ to $V_1$.

To conclude the operation of the second embodiment, only short-range radio packet which would normally have been transmitted at a point in time being close to the point in time the long-range transmitter commences or discontinues to transmit are delayed.

The $T_x$ Controller 220 (FIG. 2) may comprise a decision unit (not shown) for determining whether a packet to be transmitted by the short-range transmitter should be transmitted according to the method of the first or the second embodiment discussed above. The decision unit uses the information when the long-range radio will commence to transmit and when the long-range radio will discontinue to transmit established by the $T_x$ Controller 220 and determines whether the duration of transmission by the long-range radio transmitter will be shorter or longer than the frame length of the short-range radio system. The decision unit activates either the method of the first embodiment or the method of the second embodiment depending on whether the duration of transmission is shorter or longer than the frame length, respectively.

In the examples shown in conjunction with the first and the second embodiments it was assumed that the frame length of the short-range radio system encompassed three short-range slots. To handle the possible introduced delays a FIFO buffer capable of covering five and four slots, respectively, is required. Continuing from these examples, the dual radio communication device may support packets with compressed data covering three slots, referred to as HV3 packets, which are sent (on average) every three slots, covering two slots, referred to as HV2 packets, which are sent every two slots and covering one slot which is sent every slot. In the latter case, referred to as HV1 packets, the introduction of a packet delay according to the first or the second embodiments discussed above, is not possible because all slots are in use. In principle, the information of two HV1 packets can be compressed into one HV2 packet. For example, if the data to be transmitted, i.e. the two HV1 packets, originate from speech which has been encoded by a full-rate speech coder, the data can be transformed to data corresponding to data which has been encoded by a half-rate speech coder. Consequently, the data of each HV1 packet is halved and a HV2 packet can therefore be formed comprising the data of the two HV1 packets. In another example, when error correction coding is used, the error correction coding rate can be reduced as a means for compressing data. If the error correction coding rate is ⅓ (HV1 packets), i.e. the data comprises threefold redundancy, an error correction coding having an error correction coding rate of ⅔ (HV2 packets) or no error correction coding at all (HV3 packets) can be used. By reducing the error correction coding rate the information of each packet can be increased while keeping the same size of the packet.

Figure 7:
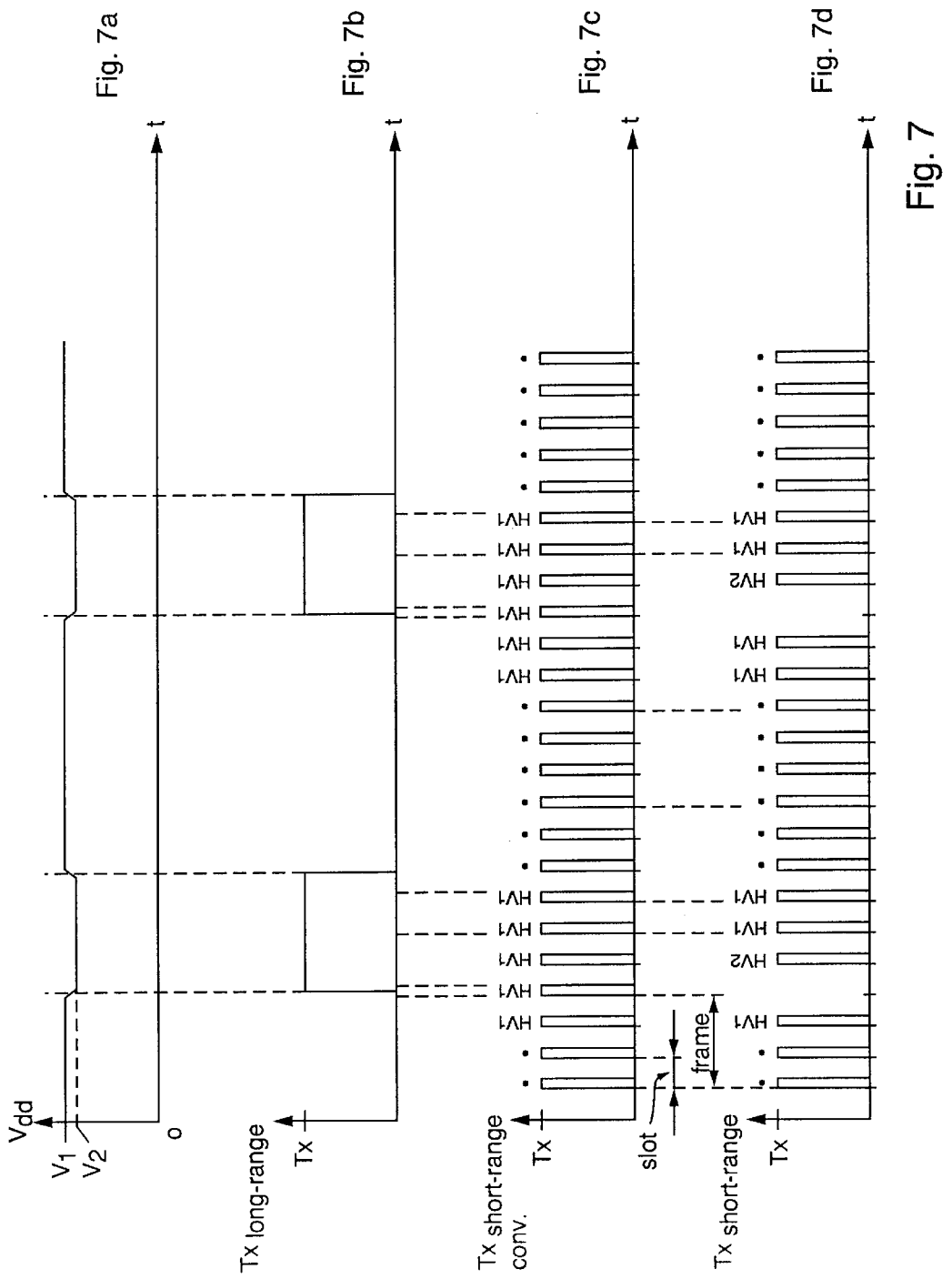
FIG. 7 shows timing diagrams illustrating the operation of a conventional communication device and a communication device according to a third embodiment of the present invention.

In FIG. 7a the power supply voltage, $V_{dd}$, in FIG. 7b transmission by the long-range radio, in FIG. 7c conventional transmission by the short-range radio and in FIG. 7d transmission by the short-range radio according to the third embodiment are shown all as functions of time, t. In FIG. 7 all time-axes have a common time-scale. In FIG. 7b and FIG. 7c it is illustrated that the long-range transmitter transmits at the same time as the conventional short-range transmitter transmits a number of packets. At the same time as the long-range transmitter transmits it is illustrated in FIG. 7a how the power supply voltage, $V_{dd}$, drops from $V_1$ to $V_2$. Again, this affects the output frequency, $f_{out}$, of the frequency synthesizer used in the short-range radio. In FIG. 7c it is illustrated how a conventional short-range radio transmits packets, HV1, with compressed data covering one slot which is sent every slot.

In a third embodiment of the present invention the $T_x$ Controller 220 (FIG. 2) establishes, in the same manner as in the second embodiment, the point in time the long-range transmitter commences or discontinues to transmit. According to the third embodiment, however, the short-range radio HV1 packets which would normally have been transmitted at a point in time being close to the point in time the long-range transmitter commences or discontinues to transmit are not only delayed but also replaced by HV2 packets. FIG. 7d shows a timing diagram illustrating the operation of the third embodiment. Compared to the conventional short-range radio system, a FIFO buffer capable of covering two slots is required to be able to defer transmission of a synchronous packet by one slot.

The method of operation of the third embodiment can be generalized in that an HV1 packet which has been delayed n slots is replace by an HVm packet, where n is an integer and m=n+1. In this case a FIFO buffer capable of covering m slots is required.

The short-range radio normally comprises a receiver frequency synthesizer (not shown) for generating reference frequencies which are used by the short-range radio receiver. The frequency synthesizer may differ from the frequency synthesizer discussed above in conjunction with FIG. 3 and FIG. 4 in that the switch 304 (FIG. 3) is replaced by a fixed connection corresponding to the switch being closed and in that no modulation signal, $V_{mod}$, is applied. The latter means that the third resistor 407 (FIG. 4) can be removed. The operation of the receiver frequency synthesizer corresponds to the operation of the frequency synthesizer of FIG. 3 and FIG. 4 as discussed above when the switch 304 (FIG. 3) is closed. Although the receiver frequency synthesizer is operating in a closed loop a change of the potential of the power supply may still affect the output frequency. Consequently, and in accordance with the discussion above, when the long-range radio commences or discontinues to transmit the potential of the power supply may change which may lead to a change of the output frequency of the receiver frequency synthesizer. This change of frequency may affect the receivers ability to receive a radio signal in the short-range radio system.

Figure 8:
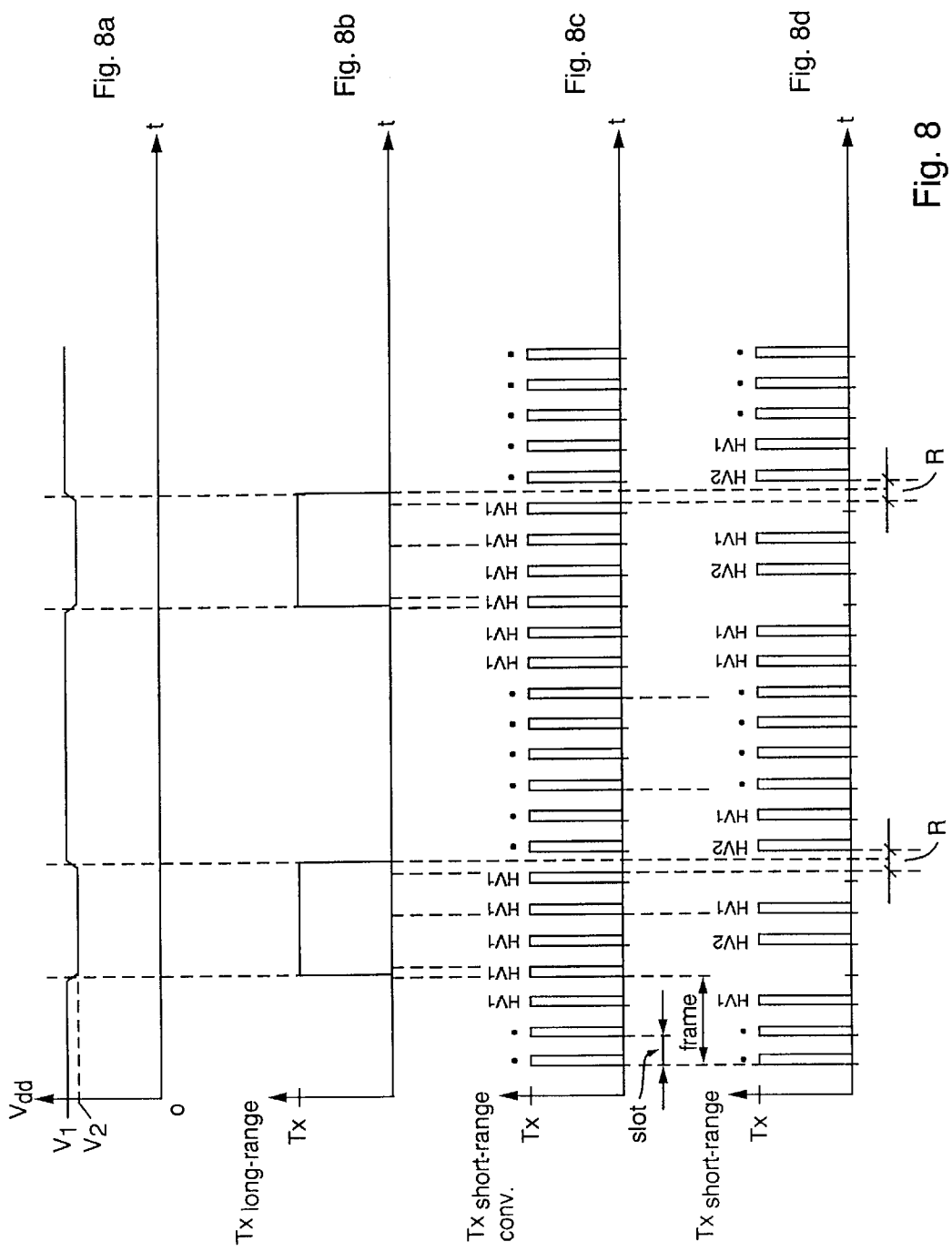
FIG. 8 shows timing diagrams illustrating the operation of a conventional communication device and a communication device according to a fourth embodiment of the present invention.

In FIG. 8a the power supply voltage, $V_{dd}$, in FIG. 8b transmission by the long-range radio, in FIG. 8c conventional transmission by the short-range radio and in FIG. 8d transmission by the short-range radio according to the fourth embodiment are shown all as functions of time, t. In FIG. 8 all time-axes have a common time-scale. In FIG. 8b and FIG. 8c it is illustrated that the long-range transmitter transmits at the same time as the conventional short-range transmitter transmits a number of packets. At the same time as the long-range transmitter transmits it is illustrated in FIG. 8a how the power supply voltage, $V_{dd}$, drops from $V_1$ to $V_2$. In FIG. 8c it is illustrated how a conventional short-range radio transmits packets, HV1, with compressed data covering one slot which is sent every slot.

In this embodiment it is assumed that each time-slot is partitioned into two pre-defined parts. In the first part the short-range radio of the dual communication device is allowed to transmit, i.e. another short-range radio is receiving. In the second part the short-range radio of the other short-range radio is allowed to transmit, i.e. the short-range radio of the dual communication device is receiving.

In the fourth embodiment of the present invention the $T_x$ Controller 220 (FIG. 2) establishes, in the same manner as in the second embodiment, the point in time the long-range transmitter commences or discontinues to transmit. Short-range radio HV1 packets which would normally have been transmitted at a point in time being close to the point in time the long-range transmitter commences or discontinues to transmit are delayed and replaced by HV2 packets in the same manner as in the third embodiment. Furthermore, the $T_x$ controller 220 of the fourth embodimental also delays the transmission of a HV1 packet and replaces it by a HV2 packet if the point in time the transmitter commences or discontinues to transmit occurs during the same time slot as a packet is scheduled to be received by the short range receiver 214. The advantage of this is that if another short-range radio device is only allowed to transmit in a time-slot where it has received a transmitted packet from the short-range radio of the dual radio communication device, the dual radio communication device can control the transmission of this other short-range radio device such that it occurs only during periods of time when the dual radio communication device knows that its long-range radio transmitter will not commence or discontinue to transmit.

Consequently, the short-range radio receiver of the dual radio communication device does not need to receive a short-range radio signal during periods of time when the receiver frequency synthesizer may be disturbed due to a change in the potential of the power supply. In a particular implementation a master-slave relationship may be established between two or more short-range radio devices. For example, a hands-free equipment comprising a short-range radio for communicating with a dual radio communication device, such as a cellular phone, may be set as the slave while the dual radio communication device is set as the master. According to the fourth embodiment of the present invention the cellular phone may now control the transmission of the short-range radio of the hands-free equipment such that the long-range radio transmitter of the cellular phone does not commence or discontinue to transmit at the same time as the hands-free equipment transmit by means of its short-range radio.

Referring to FIG. 8, it is illustrated how a HV1 packet which was scheduled to be transmitted at a point in time being close to the point in time the long-range radio commences to transmit is delayed and replaced by a HV2 packet. It is also illustrated how a HV1 packet which was scheduled to be transmitted in a time-slot when the long-range radio discontinues to transmit is delayed and replaced by a HV2 packet. Note that if a packet is scheduled to be received during this time-slot it will be received when the long-range radio discontinues to transmit. Form FIG. 8*d* it is clearly seen that if another short-range radio is limited to transmit in time-slots where it has received a transmitted packet the dual radio communication device can control the transmission of the other short-range radio device such that a time-window, labeled R in FIG. 8*d*, which normally is available for transmission by the other short-range radio, is avoided.

Figure 12:
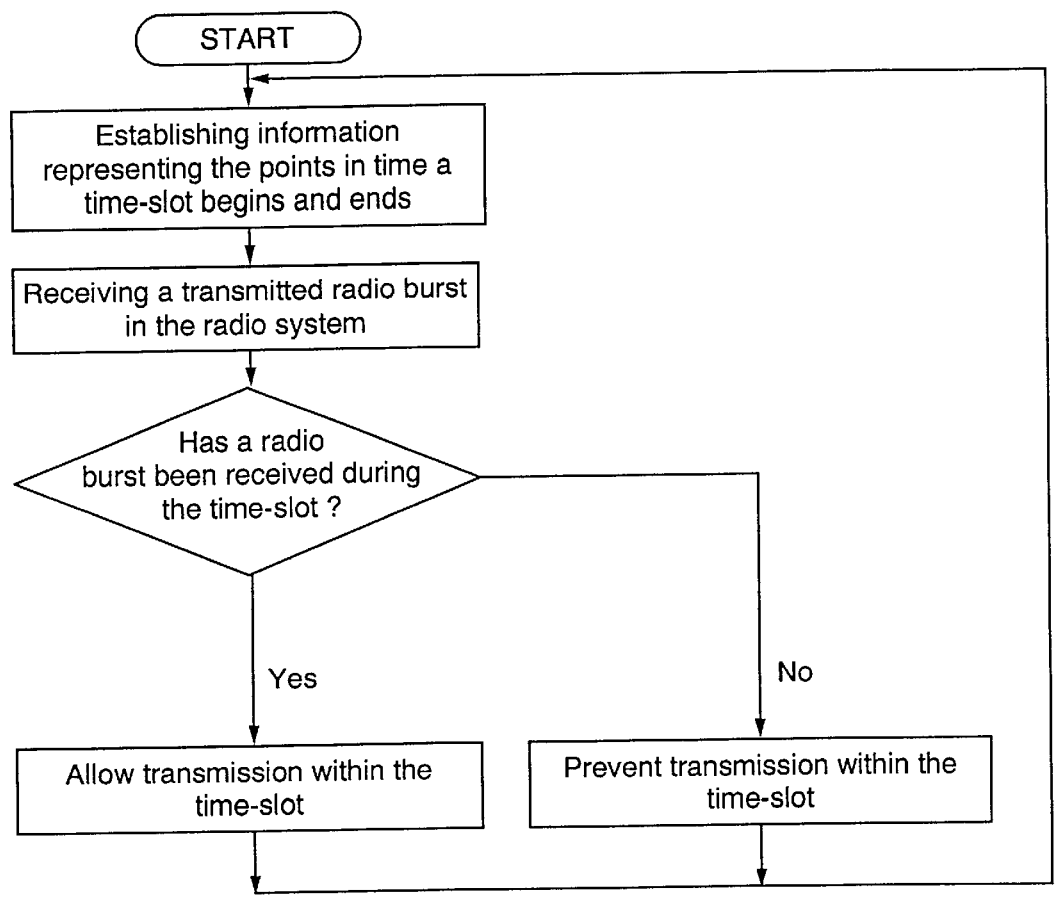
FIG. 12 shows a flow diagram illustrating a method of operating a communication device according to an embodiment of the present invention.

The method of operation of this other short-range radio communication device is further illustrated in FIG. 12.

In the four embodiments discussed above transmission within the short-range radio system is delayed whenever disturbances may be experienced due to the long-range radio transmitter. It should be understood that, in the cases where this is possible, transmission within the short-range radio system may equally well be advanced as long as the critical periods of time are avoided.

In general, the long-range radio system may be referred to as a first radio system and the short-range radio system may be referred to as a second radio system.

The man skilled in the art will understand that the present invention is not limited to the examples discussed above. For example, a frame may consist of any number of slots and the methods of operation described in the first, second, third and fourth embodiments above may be combined depending on the particular implementation of the long-range and short-range radio systems.

Although preferred embodiments of the method and apparatus of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A method of operating a communication device comprising circuitry for non-continuous transmission in a first radio system and circuitry for non-continuous transmission in a second radio system, the method comprising the steps of:

acquiring information representing a point in time the communication device will be at least one of commencing transmission and discontinuing transmission within the first radio system;

acquiring information representing a point in time the communication device is scheduled to be at least one of commencing transmission and discontinuing transmission within the second radio system;

establishing from the acquired information whether transmission within the second radio system is planned to occur at the point in time the first radio system will be at least one of commencing transmission and discontinuing transmission; and avoiding transmission by the communication device within the second radio system which is planned to occur at the point in time at which the communication device within the first radio system will be at least one of commencing transmission and discontinuing transmission.

2. The method of operating a communication device according to claim 1, wherein transmission by the communication device within the second radio system is avoided by delaying transmission within the second radio system.

3. The method of operating a communication device according to claim 1, wherein transmission by the communication device within the second radio system is avoided by advancing transmission within the second radio system.

4. The method of operating a communication device according to claim 1, wherein transmission within the second radio system takes place as bursts, each burst being transmitted within a time-slot of a frame and each frame being made up of a number of time-slots, wherein when transmission is avoided in a time-slot it is avoided during at least a whole of that time-slot.

5. The method of operating a communication device according to claim 4, wherein transmission by the communication device within the second radio system is avoided by delaying transmission within the second radio system, and wherein the method further comprises the step of:

determining if a packet to be delayed, as a result of delaying transmission within the second radio system, includes compressed data covering one slot and if so replacing the packet to be delayed with a packet of the type corresponding to compressed data covering several slots.

6. The method of operating a communication device according to claim 5, wherein the packet to be delayed is replaced with a packet of the type corresponding to compressed data covering two slots.

7. The method of operating a communication device according to claim 5, further comprising the step of:
establishing the number of slots, set equal to n, the packet to be delayed will be delayed, wherein the packet to be delayed is replaced with a packet of the type corresponding to compressed data covering m slots, where m is equal to n+1.

8. A method of operating a communication device comprising circuitry for non-continuous transmission in a first radio system and circuitry for non-continuous transmission in a second radio system, the method comprising the steps of:
determining a point in time at which the communication device will commence to transmit and a point in time at which the communication device will discontinue to transmit within the first radio system;
establishing a time-window starting at a first point in time before the point in time at which the communication device will commence to transmit and ending at a second point in time after the point in time at which the communication device will discontinue to transmit within the first radio system, and
avoiding transmission by the communication device within the second radio system which is planned to occur during the time-window.

9. The method of operating a communication device according to claim 8, wherein transmission within the second radio system takes place as bursts, each burst being transmitted within a time-slot of a frame and each frame being made up of a number of time-slots, wherein the first point in time is set to substantially correspond to a starting point of a time-slot and the second point in time is set to substantially correspond to an ending point of a time-slot.

10. A method of operating a communication device comprising circuitry for non-continuous transmission in a first radio system and circuitry for non-continuous transmission in a second radio system, the method comprising the step of:
determining a point in time at which the communication device will commence to transmit within the first radio system and a point in time at which the communication device will discontinue to transmit within the first radio system;
establishing a first time-window starting at a first point in time before and ending at a second point in time after the point in time at which the communication device will commence to transmit within the first radio system,
establishing a second time-window starting at a third point in time before and ending at a fourth point in time after the point in time at which the communication device will discontinue to transmit within the first radio system; and
avoiding transmission by the communication device within the second radio system which is planned to occur during at least one of the first and the second time-window.

11. The method of operating a communication device according to claim 10, wherein transmission within the second radio system takes place as bursts, each burst being transmitted within a time-slot of a frame and each frame being made up of a number of time-slots, wherein the first point in time and the third point in time are set to substantially correspond to starting points of time-slots and the second point in time and the fourth point in time are set to substantially correspond to ending points of time-slots.

12. A method of operating a communication device comprising circuitry for non-continuous transmission in a first radio system and circuitry for non-continuous transmission in a second radio system, the method comprising the steps of:
determining at least one point in time at which the first radio system will affect at least one of transmission and reception within the second radio system; and
avoiding transmission by the communication device within the second radio system at the at least one point in time at which the first radio system will affect at least one of transmission and reception within the second radio system, wherein transmission takes place as bursts, each burst being transmitted within a time-slot of a frame and each frame being made up of a number of time-slots, the method further comprising the steps of:
establishing information representing points in time a time-slot begins and ends;
receiving a transmitted radio burst in the radio system;
establishing whether the received radio burst is received during the time-slot; and
allowing returned transmission within the time-slot only if a packet was received during the time-slot.

13. A communication device for communication in a first radio system and in a second radio system comprising:
a first radio transmitter, the first radio transmitter transmitting a signal to a radio apparatus in the first radio system;
a first controller, the first controller controlling operation of the first radio transmitter;
a second radio transmitter, the second radio transmitter transmitting a signal to a radio apparatus in the second radio system; and
a second controller, the second controller controlling operation of the second radio transmitter;
means for establishing a time-window starting at a first point in time before the point in time at which the first radio system will commence transmission and ending at a second point in time after the point of time in which the communication device will discontinue transmission, and
means for establishing if the second controller is scheduled to transmit through the second transmitter during the time-window, wherein the second controller is adapted to avoid transmission by the second radio transmitter which is scheduled to occur during the time window.

14. The communication device according to claim 13, wherein the second controller is adapted to avoid transmission by the second radio transmitter by delaying the transmission.

15. The communication device according to claim 13, wherein the second controller is adapted to avoid transmission by the second radio transmitter by advancing the transmission.

16. The communication device according to claim 13, wherein transmission within the second radio system takes place as bursts, each burst being transmitted within a time-slot of a frame and each frame being made up of a number of time-slots, wherein when transmission is avoided in a time-slot, the second controller is adapted to avoid the transmission during at least a whole of that time-slot.

17. The communication device according to claim 16, wherein the second controller is adapted to avoid transmission by the second radio transmitter by delaying the transmission, and wherein said communication device further comprises:

means for determining if a packet to be delayed, as a result of delaying transmission within the second radio system, includes compressed data covering one slot; and means for replacing the packet to be delayed with a packet of the type corresponding to compressed data covering several slots if the packet corresponds to a packet with compressed data covering one slot.

18. The communication device according to claim 17, wherein the means for replacing the packet to be delayed replaces the packet with a packet of the type corresponding to compressed data covering two slots.

19. The communication device according to claim 17, further comprising:

means for establishing the number of slots, set equal to n, the packet to be delayed will be delayed, wherein the means for replacing the packet to be delayed replaces the packet with a packet of the type corresponding to compressed data covering m slots, where m is equal to n+1.

20. The communication device according to claim 13, wherein transmission within the second radio system takes place as bursts, each burst being transmitted within a time-slot of a frame and each frame being made up of a number of time-slots, wherein the means for establishing a time-window is adapted to set the first point in time to substantially correspond to a starting point of a time slot and the second point in time to substantially correspond to an ending point of a time-slot.

21. The communication device according to claim 13, further comprising:

an open-loop modulator for generating a signal to be transmitted by the second radio transmitter.

22. The communication device according to claim 21, wherein the open-loop modulator comprises a voltage controlled oscillator which incorporates a capacitance diode.

23. A communication device for communication in a first radio system and in a second radio system comprising:

a first radio transmitter, the first radio transmitter transmitting a signal to a radio apparatus in the first radio system;

a first controller, the first controller controlling operation of the first radio transmitter;

a second radio transmitter, the second radio transmitter transmitting a signal to a radio apparatus in the second radio system; and a second controller, the second controller controlling operation of the second radio transmitter, means for establishing a first-time window starting at a first point in time before and ending at a second point in time after a point in time the first controller will commence to transmit through the first radio transmitter;

means for establishing a second time-window starting at a third point in time before and ending at a fourth point in time after a point in time the first controller will discontinue to transmit through the first radio transmitter; and means for establishing if the second controller is scheduled to transmit through the second transmitter during the first or the second time-window, wherein the second controller is adapted to avoid transmission by the second radio transmitter during at least one of the first and the second time window.

24. The communication device according to claim 23, wherein transmission within the second radio system takes place as bursts, each burst being transmitted within a time-slot of a frame and each frame being made up of a number of time-slots, wherein the means for establishing first and second time-windows are adapted to set the first point in time and the third point in time to substantially correspond to starting points of time-slots and the second point in time and the fourth point in time to substantially correspond to ending points of time-slots.

25. A radio system in which transmission takes place as bursts, each burst being transmitted within a time-slot of a frame and each frame being made up of a number of time-slots, the radio system comprising:

a radio transmitter for transmitting a signal to a radio apparatus in the radio system;

a controller for controlling the operation of the radio transmitter;

a radio receiver for receiving a transmitted burst from the radio apparatus in the radio system;

means for establishing information representing points in time that a particular time-slot begins and ends;

means for establishing whether a received radio burst is received during the particular time-slot; and wherein the controller allows the radio transmitter to transmit during the particular time-slot only if a radio burst has been received during the particular time-slot.

26. The radio system according to claim 25 wherein the radio apparatus comprises:

a first radio apparatus transmitter for transmitting a signal to the radio receiver in the radio system;

a second radio apparatus transmitter for transmitting long-range radio signals to a long-range radio receiver in the radio system;

a first controller for controlling the operation of the first radio apparatus transmitter; and a second controller for controlling the operation of the second radio apparatus transmitter.

27. The radio system according to claim 26, wherein the first controller of the radio apparatus is adapted to avoid transmission by the first radio apparatus transmitter which is planned to occur during periods of time the second radio apparatus transmitter will be transmitting.

28. A method of operating a communication device comprising circuitry for communication in a radio system in which transmission takes place as burst, each burst being transmitted within a time-slot of a frame and each frame being made up of a number of time-slots, the method comprising the steps of:

establishing information representing points in time a time-slot begins and ends;

receiving a transmitted radio burst in the radio system;

establishing whether the received radio burst is received during said time-slot; and allowing returned transmission within the time-slot only if a packet was received during the time-slot.

29. A method of operating a communication device comprising circuitry for communication in a radio system in which transmission takes place as bursts, each burst being transmitted within a time-slot of a frame and each frame being made up of a number of time-slots, the method comprising the steps of:

i) establishing information representing the points in time a time-slot begins and ends;

ii) receiving a transmitted radio burst in the radio system;

iii) establishing whether the received radio burst is received during said time-slot; and iv) allowing returned transmission within the time-slot only if a radio burst was received during the time-slot.

30. A method of operating a communication device comprising circuitry for communication in a radio system in which transmission takes place as bursts, each burst being transmitted within a time-slot of a frame and each frame being made up of a number of time-slots, the method comprising the steps of:
  i) establishing information representing the points in time a time-slot begins and ends;
  ii) receiving a transmitted radio burst in the radio system;
  iii) establishing whether the received radio burst is received during said time-slot; and
  iv) allowing returned transmission within the time-slot only if a packet was received during the time-slot.

31. A communication device for communication in a radio system in which transmission takes place as bursts, each burst being transmitted within a time-slot of a frame and each frame being made up of a number of time-slots, the device comprising:
  a radio transmitter for transmitting a signal to a radio apparatus in the radio system;
  controller means for controlling the operation of the radio transmitter;
  a radio receiver for receiving a transmitted burst from a radio apparatus in the radio system,
  first means for establishing information representing the points in time a time-slot begins and ends; and
  second means for establishing whether a received radio burst is received during said time-slot, the communication device being characterized in that:
    the controller means allows the radio transmitter to transmit during said time-slot only if a radio burst has been received during the time-slot.

32. A communication device according to claim 31, which constitutes a hands-free equipment.

33. A communication device for communication in a radio system in which transmission takes place as bursts, each burst being transmitted within a time-slot of a frame and each frame being made up of a number of time-slots, the device comprising:
  a radio transmitter for transmitting a signal to a radio apparatus in the radio system;
  controller means for controlling the operation of the radio transmitter;
  a radio receiver for receiving a transmitted burst from a radio apparatus in the radio system;
  first means for establishing information representing the points in time a time-slot begins and ends; and
  second means for establishing whether a received radio burst is received during said time-slot, the communication device being characterized in that:
    the controller means allows the radio transmitter to transmit during said time-slot only if a packet has been received during the time-slot.

34. A communication device according to claim 33, which constitutes a hands-free equipment.

35. A communication system comprising:
  at least a first communication device for communication in a first radio system and in a second radio system;
  at least a second communication device for communication in the second radio system;
  the first communication device comprising:
    a first radio transmitter for transmitting a signal to a radio apparatus in the first radio system;
    first controller means for controlling the operation of the first radio transmitter;
    a second radio transmitter for transmitting a signal to a radio apparatus in the second radio system;
    second controller means for controlling the operation of the second radio transmitter; and
  the second communication device comprising:
    a radio transmitter for transmitting a signal to a radio apparatus in the second radio system;
    a controller means for controlling the operation of the radio transmitter; and
    a radio receiver for receiving a transmitted burst from a radio apparatus in the second radio system,
    first means for establishing information representing points in time a time-slot begins and ends,
    second means for establishing whether a received radio burst is received during said time-slot, wherein the second communication device is characterized in that the controller means allows the radio transmitter to transmit during said time-slot only if a radio burst has been received during the time-slot;
  wherein the second controller means of the first communication device is adapted to avoid transmission by the second radio transmitter which is planned to occur at the points in time the first radio system will commence or discontinue to transmit; and
  wherein transmission within the second radio system takes place as bursts, each burst being transmitted within said time-slot of a frame and each frame being made up of a number of time-slots.

36. A communication system comprising:
  at least a first communication device for communication in a first radio system and in a second radio system;
  at least a second communication device for communication in the second radio system;
  the first communication device comprising:
    a first radio transmitter for transmitting a signal to a radio apparatus in the first radio system;
    first controller means for controlling the operation of the first radio transmitter;
    a second radio transmitter for transmitting a signal to a radio apparatus in the second radio system;
    second controller means for controlling the operation of the second radio transmitter; and
  the second communication device comprising:
    a radio transmitter for transmitting a signal to a radio apparatus in the second radio system;
    a controller means for controlling the operation of the radio transmitter; and
    a radio receiver for receiving a transmitted burst from a radio apparatus in the second radio system;
    first means for establishing information representing the points in time a time-slot begins and ends;
    second means for establishing whether a received radio burst is received during said time-slot, wherein the second communication device is characterized in that the controller means allows the radio transmitter to transmit during said time-slot only if a packet has been received during the time-slot;
  wherein the second controller means of the first communication device is adapted to avoid transmission by the second radio transmitter which is planned to occur at the points in time the first radio system will commence or discontinue to transmit; and
  wherein transmission within the second radio system takes place as bursts, each burst being transmitted within said time-slot of a frame and each frame being made up of a number of time-slots.

* * * * *

UNITED STATES PATENT AND TRADEMARK OFFICE
CERTIFICATE OF CORRECTION

PATENT NO. : 6,714,530 B1
DATED : March 30, 2004
INVENTOR(S) : Jaap Haartsen et al.

It is certified that error appears in the above-identified patent and that said Letters Patent is hereby corrected as shown below:

Column 15,
Line 25, replace "radio system, and" with -- radio system; and --.
Line 49, replace "first radio system," with -- first radio system; --.

Column 20,
Line 7, replace "second radio system," with -- second radio system; --.
Line 9, replace "begins and ends," with -- begins and ends; --.

Signed and Sealed this

Thirtieth Day of May, 2006

JON W. DUDAS
*Director of the United States Patent and Trademark Office*